United States Patent [19]

Cassar

[11] 4,155,771

[45] May 22, 1979

[54] PLASTICIZED SULFUR WITH IMPROVED STABILITY

[75] Inventor: Richard D. Cassar, West Chester, Pa.

[73] Assignee: Suntech, Inc., Philadelphia, Pa.

[21] Appl. No.: 892,816

[22] Filed: Apr. 3, 1978

[51] Int. Cl.² .............................................. C09K 3/00
[52] U.S. Cl. ............................................... 106/287.32
[58] Field of Search ................ 106/287.32; 252/45; 260/125, 139, 666 A, 666 B, 666 PY

[56] References Cited

U.S. PATENT DOCUMENTS

| | | | |
|---|---|---|---|
| 3,211,709 | 10/1965 | Adamek et al. | 260/80.7 |
| 3,498,915 | 3/1970 | Coleman | 252/45 |
| 3,998,897 | 12/1976 | Kovach et al. | 260/666 A |

*Primary Examiner*—Theodore Morris
*Attorney, Agent, or Firm*—J. Edward Hess; Donald R. Johnson; Paul Lipsitz

[57] ABSTRACT

Sulfur is plasticized by the addition of 1,4,4a,5,8,8a-hexahydro-1,4,5,8-exo,endo-dimethanonaphthalene which is an adduct of norbornadiene and cyclopentadiene.

4 Claims, No Drawings

PLASTICIZED SULFUR WITH IMPROVED STABILITY

It is well known in the art that sulfur reacts with olefinic compounds and such reaction is the basis for the vulcanization of rubber. In U.S. Pat. No. 3,211,709 there is disclosed the vulcanization with sulfur of a copolymer made by catalytically reacting an aliphatic monoolefin and an unsaturated bridge-ring hydrocarbon containing at least two double bonds. The products thus obtained are conventionally compounded to give rubber-like materials.

It is also well known that diolefins will plasticize sulfur to give a fairly rigid, resinous, noncrystalline product. Diolefins known to effect such plasticization include dicyclopentadiene, myrcene, alloocimene, limonene and dipentene. Some diolefins will not react with the molten sulfur or the degree of reaction is so small that there is essentially no apparent change in the sulfur properties. In some cases compounds that might normally react give no discernible product due to being too volatile to stay in contact with the sulfur under the conditions used for reaction. As indicated, where reaction does occur the product is a rigid, noncrystalline product and because of such properties the utility of the composition is limited.

It has now been found that when an adduct of norbornadiene and cyclopentadiene is reacted with sulfur a flexible product is obtained which is of greater utility. Thus, the flexible plasticized sulfur compositions of the invention may be used in formulations for road surfaces and road markings, in adhesive and caulking formulations and the like. Also, some of the products of this invention which are somewhat crystalline have utility as additives to aggregate to make concrete-like materials.

The method of carrying out the invention is quite simple. The Diels Alder adduct of cyclopentadiene and norbornadiene (e.g. 1,4,4A,5,8,8a-hexahydro-1,4,5,8-exo-endo-dimethanonaphthalene, referred to as BCHC) is added with agitation to molten sulfur held at a temperature of at least about 150° C. and after thorough mixing is achieved the reaction mass is allowed to cool. As the adduct is added the mixture darkens and becomes very viscous. Preferably the heating and mixing operation is carried out rapidly to avoid volatilization and loss of the diene adduct. The adduct of cyclopentadiene and norbornadiene (BCHC) and its preparation is known in the art and is described in the article by J. K. Stille and D. A. Frey in *J. Am. Chem. Soc.*, Vol. 81, page 4273, August 20, 1959.

The amount of adduct which may be added to the molten sulfur may vary from about 5% to about 50% by weight of the sulfur. Preferably, from about 15% to about 50% will be used if crystallinity of the product is to be avoided. Below about 15% the product shows some crystallinity on cooling and, although not preferred, such products are useful as a concrete substitute when mixed with aggregate. The products containing from about 45% to about 50% of adduct often show the caracteristics of a foam.

The preferred noncrystalline, plasticized sulfur products of the invention are useful as sealants, caulking compositions, additives for asphalt, rubber and elastomer formulations and the like. Such formulations are well known in the art and need not be further described here.

In order to further illustrate the invention the following examples are given:

EXAMPLE 1

Twenty grams of sulfur is heated to a temperature of about 165° C. and five grams of BCHC is added with rapid stirring. Reaction occurs very quickly and after about 30 seconds of stirring the reaction mass is allowed to cool. The resulting product is a hard, transparent, dark red solid which shows no crystallinity on observation after 30 days. In contrast, if dicyclopentadiene is used instead of BCHC, the product is a black, opaque solid which becomes crystalline in 7 days.

When the above experiment is repeated using the norbornadiene alone, the product does not show the flexibility obtained when the BCHC adduct is added to sulfur.

EXAMPLE 2

Example 1 is repeated with BCHC except that the amount added is about 33% by weight of the sulfur. As the reaction mass cools, fibers of about 5 feet in length are drawn from the mixture. The cooled product is a dark, transparent, odorless solid which is noncrystalline and shows no change after 45 days.

EXAMPLE 3

When Example 1 is repeated, but with 25 g. of sulfur and 12.5 g. of BCHC the product is similar to that obtained in Example 1 but is very brittle and is somewhat foamed.

EXAMPLE 4

Five grams of BCHC is added to fifteen grams of sulfur as in Example 1, but the addition is made very slowly. The product of 18.3 g. is a flexible, somewhat orange solid which retains a slight odor of BCHC. The bottom half of the product is noncrystalline while the top half shows crystallinity.

EXAMPLE 5

This example shows the effects of various amounts of BCHC on the crystallinity of the product. BCHC is added to molten sulfur as in Example 1 held at a temperature between about 150° to about 165° C., thoroughly mixed, and then cooled. The following table illustrates the data and the results:

TABLE

| Grams Added | | % | Grams Of | |
|---|---|---|---|---|
| Sulfur | BCHC | BCHC | Products | Product Properties |
| 20 | 5 | 25 | 24.1 | Red to amber, transparent, odorless solid. Very slight crystallinity appears at edges after 7 days; no further change in 14 days |
| 21 | 4 | 19 | 24.0 | Stiff but flexible; some crystallinity at orange surface; rest of product dark and noncrystalline. |
| 22 | 3 | 13.6 | 24.4 | Orange crystalline surface with rest of product amorphous |
| 23 | 2 | 8.7 | 23.3 | Mostly orange and crystalline. |
| 24 | 1 | 4.2 | 24.4 | Mostly orange and crystalline. |

As can be seen from the above data, as the concentration of BCHC decreases, crystallinity of the product increases.

The invention claimed is:

1. A process for plasticizing sulfur to obtain a flexible product which comprises adding with thorough mixing 1,4,4a,5,8,8a-hexahydro-1,4,5,8-exo-endo-dimethanonaphthalene to molten sulfur held at a temperature of at least about 150° C., said 1,4,4a,5,8,8a-exo-endo-dimethanonaphthalene being added in an amount of from about 5% to about 50% by weight of sulfur.

2. The process of claim 1 where the 1,4,4a,5,8,8a-hexahydro-1,4,5,8-exo,endo-dimethanonaphthalene is added in an amount from about 15% to about 50% by weight of sulfur.

3. A plasticized sulfur composition obtained by adding with thorough mixing 1,4,4a,5,8,8a-exo-endo-dimethanonaphthalene to molten sulfur at a temperature of at least about 150° C., in an amount of from about 5% to about 50% by weight of said sulfur.

4. The sulfur composition of claim 3 where the added 1,4,4a,5,8,8a-hexahydro-1,4,5,8-exo,endo-dimethanonaphthalene is in the amount of from about 15% to about 50% of sulfur.

* * * * *